United States Patent
Smetz (10) Patent No.: US 10,131,523 B2
(45) Date of Patent: Nov. 20, 2018

(54) RING ELEMENT HAVING A DIVIDED BASE FOR A LASHING OR ATTACHMENT MEANS

(71) Applicant: RUD KETTEN RIEGER & DIETZ GMBH U.CO.KG, Aalen (DE)

(72) Inventor: Reinhard Smetz, Nordlingen-Kleinerdlingen (DE)

(73) Assignee: RUD KETTEN RIEGER & DIETZ GMBH U. CO. K.G. (DE)

( * ) Notice: Subject to any disclaimer, the term of this patent is extended or adjusted under 35 U.S.C. 154(b) by 0 days.

(21) Appl. No.: 15/309,628

(22) PCT Filed: Apr. 29, 2015

(86) PCT No.: PCT/EP2015/059395
§ 371 (c)(1),
(2) Date: Dec. 15, 2016

(87) PCT Pub. No.: WO2015/169673
PCT Pub. Date: Nov. 12, 2015

(65) Prior Publication Data
US 2017/0174478 A1    Jun. 22, 2017

(30) Foreign Application Priority Data
May 9, 2014    (DE) .................. 10 2014 208 819

(51) Int. Cl.
*B66C 1/66*    (2006.01)
*B60P 7/08*    (2006.01)
(52) U.S. Cl.
CPC .............. *B66C 1/66* (2013.01); *B60P 7/0807* (2013.01)

(58) Field of Classification Search
CPC . B66C 1/66; B66C 1/666; F16G 15/08; B60P 7/0807
(Continued)

(56) References Cited

U.S. PATENT DOCUMENTS 3,163,901 A * 1/1965 Brawand .................. B66C 1/36
                                                           294/82.1
4,699,410 A    10/1987 Seidel
(Continued)

FOREIGN PATENT DOCUMENTS

CN    1606665 A    4/2005
CN    1606666 A    4/2005
(Continued)

OTHER PUBLICATIONS

International Search Report PCT/EP2015/059395 dated Jun. 12, 2015.
(Continued)

*Primary Examiner* — Dean J Kramer
(74) *Attorney, Agent, or Firm* — Edell, Shapiro & Finnan, LLC (57) ABSTRACT

The invention relates to a ring element (1) for a lashing or attachment device (40), with a base (10) and with a ring section (2) that is closed in an opposite position to the base (10) and that forms a ring opening (4). In order to be able to attach in particular loop-shaped ropes or strips, but also attachment devices such as shackles, hanging elements, loop hooks, in a simpler way, the base (10) is divided according to the invention by an attachment channel that reaches into the ring opening (4). A closing element (42) that is formed in a way as to be insertable in the attachment channel (8) preferably fits flush with the base (10).

17 Claims, 5 Drawing Sheets

(58) Field of Classification Search
USPC .......................................................... 294/215
See application file for complete search history.

(56) References Cited

U.S. PATENT DOCUMENTS

| | | | |
|---|---|---|---|
| 6,022,164 A | 2/2000 | Tsui et al. | |
| 6,652,012 B1 | 11/2003 | Fuller et al. | |
| 6,994,501 B2 * | 2/2006 | Smetz | F16G 15/08 411/400 |
| 9,193,570 B2 * | 11/2015 | Norpoth | B66C 1/66 |
| 2004/0228699 A1 | 11/2004 | Venton-Walters et al. | |
| 2005/0069379 A1 | 3/2005 | Smetz | |

FOREIGN PATENT DOCUMENTS

| | | |
|---|---|---|
| CN | 201671935 U | 12/2010 |
| DE | 8508172 U1 | 6/1985 |
| DE | 9316475 U1 | 2/1995 |
| DE | 29513183 U1 | 10/1995 |
| DE | 20121121 U1 | 4/2002 |
| DE | 20121123 U1 | 4/2002 |
| DE | 20121118 U1 | 5/2002 |
| DE | 102007061349 A1 | 6/2009 |
| DE | 102009040524 A1 | 3/2011 |
| DE | 202012101594 U1 | 5/2012 |
| EP | 2412660 A1 | 2/2012 |
| GB | 166684 * | 7/1921 |
| GB | 166684 A | 7/1921 |
| WO | 2013131513 A1 | 9/2013 |

OTHER PUBLICATIONS

Chinese Patent Office Search Report for Chinese patent application No. 2015 800 370 64.1 dated Sep. 28, 2017.
German Search Report for German Patent Application DE102014208819.4, dated Oct. 17, 2017.
European Office Action for corresponding European Application No. 15720068.4 dated Apr. 30, 2018.

* cited by examiner

RING ELEMENT HAVING A DIVIDED BASE FOR A LASHING OR ATTACHMENT MEANS

The invention relates to a ring element for a lashing or attaching device, with a base and a ring section that is located opposite to the base and that opens up a ring opening.

A ring element with these features is known for example from the DE 201 21 123 U1. A chain, a rope or a strip can be attached on the ring section. The ring element is installed firmly to a load with its base so that the load can be lashed or moved by means of the chain, the rope or the strip.

Other structural forms of lashing or attaching devices are known from the DE 85 08 172 U1, the DE 295 13 183 U1, the DE 201 21 121 U1 and the DE 10 2009 040 524 A1. These devices all have the disadvantage that chain links or loops can only be attached by means of connection elements such as shackles, snap hooks or ring loops. Although this problem is solved by the lashing or attaching device of the DE 201 21 118 U1 that is equipped with a fork crown and a locking bolt, this lashing or attaching device can only be used to a limited extent for the application of strips or ropes. In addition, the laterally transmissible forces are restricted by the open structure of the fork crown.

The invention is consequently based on the purpose of improving the known lashing or attaching devices and their elements in a way that also strips or ropes can be used without any problem and that high forces can be fed into such strips or ropes.

For the initially mentioned ring element, this problem is solved according to the invention by the base being divided by an attachment channel that leads into the ring opening.

This structurally simple solution allows for a loop to be easily inserted into the ring opening through the base. If the ring element is fastened with its base on the load or on a latching device, the ring opening will be automatically closed and the rope or the strip will be secured in the ring section. In addition, the base is used for force transmission. The ring element according to the invention allows in particular for the use of round slings made of textile material that can replace metallic connection elements used up to present due to high-strength textile materials such as polyethylene with an ultra-high molecular weight. Also rigid ring elements can be inserted in the ring opening through the attachment channel.

This solution can be further improved by the following features that are each advantageous in itself and that can be combined independently with one another.

Therefore, at least one circumferential surface of the base can be circular in the cross-section at least by sections according to a first variant. The cross-section is preferably perpendicular to the plane of the ring opening. The ring-shaped circumferential surface can be used as a centering surface by means of which the base is aligned in a borehole on the side of the load. In addition, the ring-shaped circumferential surface allows for a rotatable installation of the base, for example by means of a slide bearing or a roller bearing. The ring-shaped circumferential surface can be located directly below the ring section and/or limited by the ring section.

The attachment channel interfuses the base continuously, preferably in the direction perpendicular to the plane that is defined by the ring section.

At least one of the two lateral walls of the attachment channel that face one another can be equipped with at least one form-fit element according to a further variant in order to be able to insert a closing element in the attachment channel and to hold such closing element in a form-fit way. To be able to transmit as high as possible loads, both side walls are preferably equipped with at least one form-fit element.

The at least one form-fit element can have at least one locking surface with a normal line direction that extends in a load direction in which the ring element is attached during operation. Through the locking surface, a load that acts on the ring element can be absorbed via the form-fit element. The at least one form-fit element is preferably equipped with at least one pair of inversely oriented locking surfaces in order to be able to absorb loads, which act in the plane of the ring opening, in both directions.

The at least one form-fit element and/or the at least one locking surface can further extend preferably transversally to the plane of the ring opening in a continuous way along a lateral wall. This way, the form-fit element or the locking surface can form a guiding along which a closing element can be inserted in the attachment channel transversally to the plane of the ring opening.

A circumferential surface of the base can be equipped with a circumferential groove. Opposite to the circumferential groove that is used for centering, this circumferential surface can have a smaller diameter. Further, it can have a larger distance from the ring section than the circumferential surface that is used for centering or attachment. The groove can be used as a form-fit element by means of which the base is attached to the load. In addition or alternatively, the groove can also be designed as a running surface for roller bodies in a way that the base can be installed rotatably. Therefore, the groove can have a rounded ground that is hardened and/or polished.

The base can have a pin that is used for fastening the ring element and that extends away from the ring section. The pin can be equipped with a fastening element such as a thread and/or pin receptacles. But also a groove that serves as a running surface of a roller bearing can be used as a fastening element, for example if the roller bodies running in the groove create a form-closure in the direction of the rotation axis of the roller bearing.

In order to also absorb strong forces that act on the ring element, the ring element can be supported by two preferably concentrical bearings that are located at different distances from the ring section. To be able to support shear forces better, the bearing that is located more closely to the ring section can have a larger diameter; in particular, this bearing can also be formed as a slide bearing. The slide bearing can have a separate slide bearing ring that also encloses the closing element and that is used at the same time for securing the closing element. As already explained above, the slide bearing can be located on a circumferential surface of the base. The slide bearing ring can have a press fit.

A lashing or attachment device that has a ring element in one of the above designs can advantageously be equipped with a closing element, whose lateral areas are formed complementarily to the attachment channel and which can be inserted in the attachment channel. The attachment channel is closed by the closing element.

In particular, the closing element can be equipped with at least one form-fit element that is formed complementarily to the at least one form-fit element of the attachment channel. The form-fit element of the closing element can in particular be equipped with at least one locking surface on the lateral areas.

At least one lateral area of the closing element and at least one side wall of the attachment channel can together form a longitudinal guiding in a sectional way through which the closing element is guided movably in the direction that is perpendicular to the plane of the ring opening. The longitudinal guiding can comprise a locking surface.

The form-fit elements of the attachment channel and the closing element can in particular have grooves, fins, bulges and/or protrusions that are formed complementarily to one another and that extend transversally to the plane that is defined by the ring section.

Instead of or in addition to form-fit elements, also other fastening devices can be provided for installation of the closing element on the ring element. For example, the lateral walls of the attachment channel can have thread sections into which a closing element can be screwed from the side that faces away from the ring section. In addition, it is possible to secure the closing element in the attachment channel and/or on the base by means of one or multiple pins or bolts without form-fit elements being necessary in addition. However, the relatively high workload for closing and opening of the attachment channel, which emerges each time a new loop has to be inserted in the ring opening, seems disadvantageous in case of these solutions.

The closing element can have a pin on the side that faces away from the ring element. The pin can be used for installation and/or fixing of the ring element and/or the lashing or attachment device on the load. If the closing element is inserted in the ring element, the pin will protrude out of the attachment channel. The cross-section of the pin is preferably prismatic.

The pin can be equipped on a circumferential surface, which in particular has a circular cross-section, with a circumferential groove and/or attachment devices such as a thread. The groove can be used as a running surface for roller bodies and/or as a form-fit element.

If the closing element is inserted in the attachment channel, front surfaces continue a circumferential surface of the base preferably flushly on ends of the closing element that are opposite to one another. In the inserted state of the closing element, the front sides on the side of the end point preferably in the direction that is transversal to the plane of the ring opening.

The front surfaces can form two sections of respectively one cylinder surface area that are diametrically opposite to one another. In the inserted state, these front surfaces preferably complement a circumferential surface of the socket with the shape of a cylinder surface. The goal is to form preferably a continuous circular cylinder surface area that can be used as a centering or attachment surface. The diameter of the cylinder surface area can be larger than the diameter of the pin.

In a further preferred embodiment, the lashing or attachment device can be equipped with a fastening sleeve that has a fastening section to attach a load or a lifting gear and a collar that encloses a receptacle on the side that faces away from the fastening section. The receptacle is designed preferably complementarily to the base of the ring element.

The fastening sleeve can be connected in a form-fit way to the ring element and/or the closing element. Form-fit elements can in particular hold the roller bodies of a bearing that hold the ring element rotatably on the fastening sleeve.

The collar can cover the ends of the attachment channel, which are located in the direction transversal to the plane of the ring opening, at least in a sectional way. Through the collar, the closing element can be held in the attachment channel without the risk of falling out in the direction transversal to the plane of the ring opening.

If the ring element in the fastening sleeve is rotatable by means of a slide bearing, also a slide bearing ring can be provided instead of the collar for securing the closing element. Due to the slide bearing ring, also small surface protrusions between the closing element and the ring element can be tolerated.

The ring element can be fastened on the fastening sleeve only indirectly via the interposed closing element, in particular its pin. This allows for forming a modular system with modules that are replaceable by one another and in which different ring and/or closing elements with a single structural form of a fastening sleeve and/or different structural forms of fastening sleeves can be connected with a structural form of ring and/or closing elements.

According to a further embodiment, the lashing or attachment device can have a connection element in addition to the ring element. The connection element can be sewed or woven of a textile fiber and form a loop that is inserted through the attachment conduct into the ring opening. Other connection elements that can be used as well are for example ring elements, loop hooks or shackles. In the connection elements mentioned last and made of rigid bodies, the attachment channel can be used to enable a pairing of the ring element with the connection element in a way that is detachment-free and that ensures error-free operation. This way, it can be prevented that a connection element and a ring element are used with one another, which do not fit together due to their strength categories and/or approved loads and that must not be used with one another for reasons of workplace safety either.

This can be achieved in a simple way by the connection element being equipped with a flattened section. In order to have the flattened section and the attachment channel prevent incorrect plugging, the flattened section can be designed complementarily to the attachment channel according to a possible embodiment.

A further embodiment can provide the connection element to be equipped with a flattened section that can be inserted through the attachment channel into the ring opening. While being inserted through the ring opening, the connection element can be designed tiltably by the ring opening along the ring section. The flexibility of the connection element in this embodiment allows it to adapt to different directions of stress.

Outside of the flattened section, the connection element can preferably not be inserted in the attachment channel and/or the ring opening.

The function of the attachment channel of the ring element with a complementary flattened section of the connection element to prevent the risk of incorrect plugging can be improved in that the connection element according to a further embodiment can only be inserted in the ring element in a single relative position of the connection element and the ring element. A possibility to achieve this functionality consists in that the clear span, in particular the clear span adjacent to the flattened section, of the connection element is smaller than the overall height of the ring element. The overall height of the ring element is thereby measured in the direction of the attachment channel towards the ring opening, i.e. along an inserting direction. This way, the connection element can only be inserted in the attachment channel with the outer edge of the flattened section first.

A further embodiment can provide a clear span of the connection element to be larger than the largest width of the ring element. The clear span can thereby be measured perpendicularly to the clear span that is adjacent to the flattened section. The largest width is thereby measured perpendicularly to the plane defined by the ring opening, i.e. perpendicularly to the greatest height.

In addition, it can be provided for the connection element in the ring opening to be held rotatably from an inserting position, in which the flattened section in the ring opening is located opposite to the attachment channel, into an operating position in which the flattened section is moved out of the ring opening. Also this measure prevents incorrect plugging as only connection elements that fulfill the geometrical requirement can be used. Another advantage of this embodiment consists in that the flattened section is not in contact with the ring element in the operating position in which the connection element is impacted by load. This means a higher flexibility of the connection element in the ring opening because the flattened section would restrict flexibility.

In the following, the invention will be explained exemplarily and in greater detail based on different embodiments with reference to the enclosed Figures. According to the above description, the different features in the individual embodiments can be combined with one another in any way or omitted if the advantage connected to a feature is important or not needed for an application.

The structure of a ring element 1 is at first described with reference to FIGS. 1 and 2. The ring element 1 is in particular used for attaching round slings made of high-strength textile fibers such as polyethylene with an ultra-high molecular weight (UHMWPE).

The ring element 1 has a ring section 2 that opens up a ring opening 4. The ring section 2 is open on a lower area 6 on the fastening side. At this point, an attachment channel 8 leads into the ring opening. The attachment channel is open on the side of the load or the lifting gear and extends continuously and transversally to the ring opening 4. A base 10 is used for indirect or direct fastening of the ring element 1 on a lifting gear (not shown) of a load (not shown) or a lashing device (not shown) such as a chain adjuster. The base 10 is divided by the attachment channel 8. The ring section 2 is closed opposite to the base 10.

Figure 1:
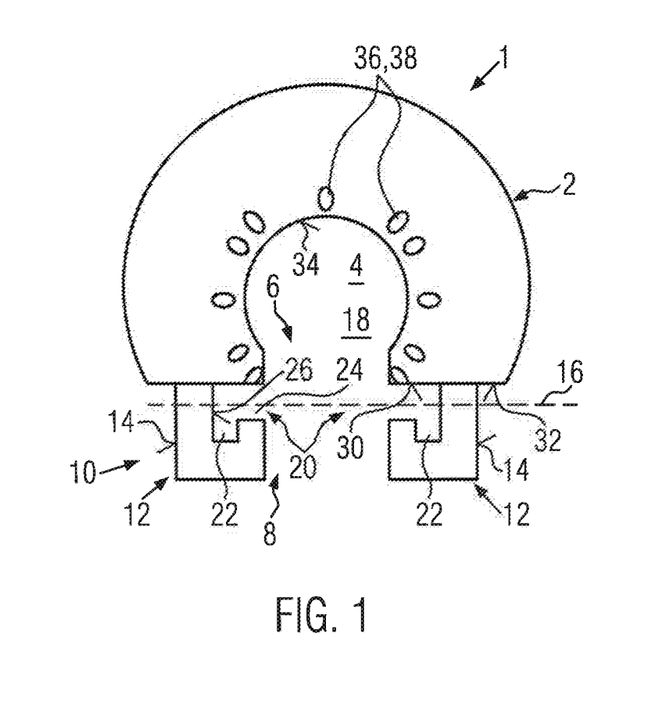
FIG. 1 a schematic front view of a first exemplary embodiment of the ring element according to the invention.
Figure 2:
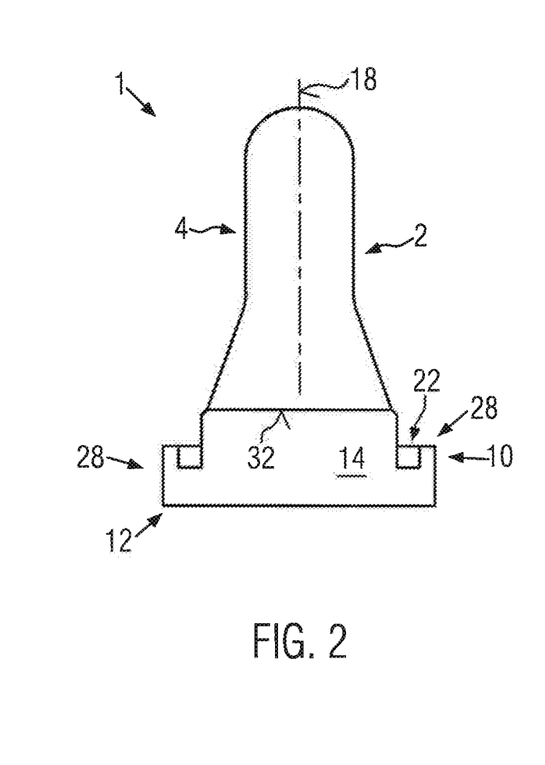
FIG. 2 a schematic side view of the ring element of FIG. 1.

As shown in FIG. 1, the base 10 can have two halves 12 that can be jaw-shaped. A circumferential surface 14 of the base 10 preferably forms a surface area of a circular cylinder at least in a sectional way, in particular in a cross-section 16 that extends perpendicularly to a plane 18 that is formed by the ring opening 4. The circumferential surface 14 can be used for centering and/or rotatable installation of the ring element and be directly adjacent to the ring section 2.

The side walls 20 of the attachment channel 8 that are opposite to one another are equipped with at least one form-fit element 22. As displayed, the form-fit element 22 can comprise an undercut groove 24 whose ground 26 points towards the attachment channel 8. One the ends 28 of the ring element 1 that are located in the direction transversal to the plane 18, the attachment channel 8 and the groove 24 are open so that they can be fitted from the ends 28.

The two side walls 20 of the attachment channel 8 can be equipped with identical form-fit elements 22. A wall 30 of the groove 24 can be formed from a floor area 32 of the ring section 2. The floor area 32 is preferably flat.

The ring section 2 is preferably forged, the attachment channel 8 can be manufactured with a machining method. The ring section 2 has a spherical shape towards the ring opening 4. Markings 36 in form of recesses 38 can be provided in the area of an edge 34 of the ring opening 4. The markings 36 are installed at defined angle positions around the ring opening 4. By means of the markings 36, the position of the lashing or attachment device can be detected optically by operating staff. Therefore, it is possible to check fast whether the ring element 1 is used within the allowed directions of stress.

Figure 3:
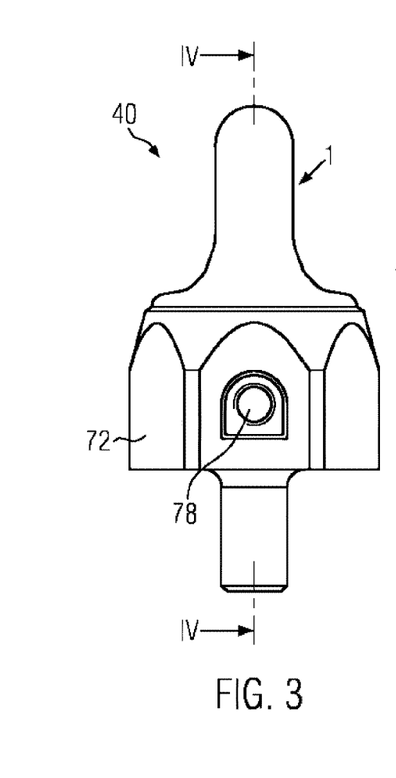
FIG. 3 a schematic side view of a first embodiment of a lashing or attachment device according to the invention with a slightly modified ring element in relation to FIG. 1.
Figure 4:
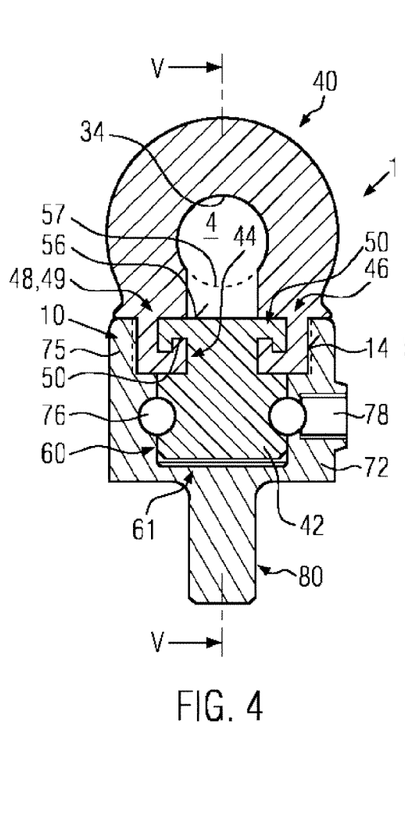
FIG. 4 a schematic section view along the line IV-IV of FIG.3.
Figures 5, 5A:
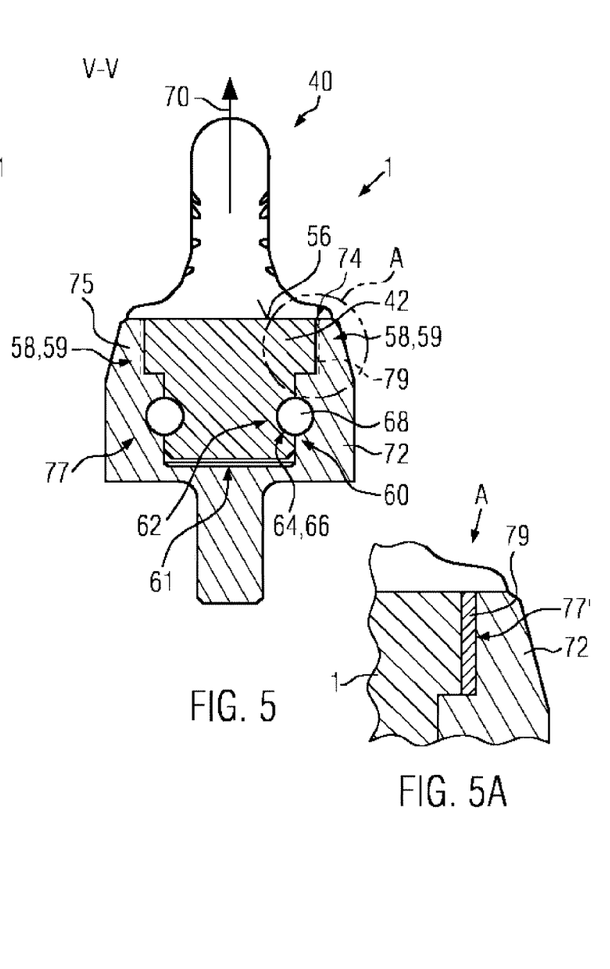
FIG. 5 a schematic section view along the V-V of FIG. 4.
FIG. 5A a detail A of FIG. 5.

FIGS. 3 to 5 show how the ring element 1 can be used as part of a lashing or attachment device 40.

For this purpose, the ring element can be complemented by a closing element 42 that inserted in the attachment channel 8. Lateral areas 44 of the closing element 42 can be formed complementarily to the side walls 20 of the attachment channel 8 at least in a sectional way on its end 46 that faces the ring element 1. In particular, the closing element 42 can have form-fit elements 48 that are designed complementarily to the form-fit elements 22 of the base 10.

In the displayed embodiment, the form-fit elements 22, 48 form a linear guiding 49 along which the closing element 42 is movable into the attachment channel 8 in the direction that is transversal to the plane of the ring opening 4. In case of a completely inserted closing element 42, the attachment channel 8 is closed as shown in FIGS. 4 and 5.

The form-fit element 22 and the form-fit element 48 each have locking surfaces 50 whose normal line direction extends along a direction in which the base 10 and the ring section 2 and/or the ring section 2 follow each other.

An upper side 56 of the closing element 42 can be accessed from the ring opening 4 in the inserted state of the closing element 42. The upper side 56 can reach up to the ring opening 4 and finish flushly with the edge 34 of such ring opening so that the ring opening 4 is circular in case of an inserted closing element. This is also indicated by the dashed line 57 in FIG. 4.

On its end 46 that faces the ring opening, the closing element 42 has two front sides 58 on the ends 59 that are opposite to one another and that form sections of the surface area of a circular cylinder. In case of an inserted closing element 42, the front areas 58 are preferably arranged flushly with the circumferential surface 14 of the base 10 of the ring element 1. This way, a continuous, preferably bumpless circumferential area, which is used for centering and/or rotatable installation of the arrangement composed of the ring element 1 and the closing element 42, is formed in the area of the base 10.

The closing element 42 can further be equipped with a pin 60 that protrudes on the end 61 of the closing element 42 that faces away from the ring element 1 and/or from the upper side 56. The pin 60 preferably has a circular cylindrical form but can also take on other prismatic forms. Its diameter is preferably smaller than the diameter of the circumferential surface 14. The pin 60 is used for fastening of the closing element 42 on the side of the load or the lifting gear and indirectly of the ring element 1 via the form-fit elements 22, 48. In the inserted state of the connection element, the pin 60 protrudes out of the attachment channel 8.

The pin 60 can be equipped with fastening elements 62 so that it can be installed on a carrier on the side of the load or lifting gear that is respectively formed in a complementary way. In the embodiments, the fastening element 62 is designed in form of a circumferential groove 64. The groove 64 can have a rounded ground 66 and be used as a running surface for roller bodies 68. A form-closure, which locks the closing element 42 in a direction of stress 70 and which allows at the same time a rotary movement of the pin 60 and the ring element 1 connected to such pin, can be produced via the roller bodies 68 as connection elements. However, the pin can also be designed as a threaded pin.

Eventually, the lashing or attachment device 40 can have a fastening sleeve 72 that can be formed complementarily to the base 10 and/or sections of the closing element 42. In particular, the fastening sleeve 72 can have an internal receptacle 74 in which the base 10 and/or its circumferential surface 14 can be integrated. In the composed state, the fastening sleeve 72 preferably fits closely on the circumferential surface 14. With a collar 75, it covers the attachment channel 8 in the direction that is transversal to the plane 18 and therefore secures the closing element 42 in the attachment channel 8 undetectably. The collar 75 absorbs the circumferential surface 14.

In addition, also the pin 60 can be integrated and fastened in the receptacle 74. The receptacle 74 can comprise a bearing groove 76 that is complementary to the groove 64 and the roller bodies 68 and therefore form a rotary bearing 77 together with the pin 60. In order to be able to fill the roller bodies 68 into the receptacle 74 together with the ring element 1 after inserting the pin 60, the fastening sleeve 72 can be equipped with a filling opening 78 that reaches into the receptacle 74.

The circumferential surface 14 of the base 10 can be integrated in a slide bearing ring 79 in order to reduce the friction between the fastening sleeve 72 and the ring element 1. The slide bearing ring secures at the same time the closing element 42 in the attachment channel 8. The slide bearing ring 79 fits closely on both the ring element 1 as well as on the closing element 42.

FIG. 5A shows the detail A of FIG. 5. The slide bearing ring 79 preferably sits on a press fit on the circumferential surface 14. Together with the rotary bearing 77, the slide bearing 77' forms a torque support that force components integrate transversally to the direction of stress 70.

The slide bearing 77' is preferably located more closely to the ring opening 4 than the roller bearing 77. In addition, it can have a larger diameter than the roller bearing 77 in order to be able to support lateral forces on a greater surface.

The fastening sleeve 72 can be equipped with a further, for example pin- or cup-shaped, fastening section 80 for fastening on the side of the load or the lifting gear on the side that faces away from the ring element 1.

Figure 6:
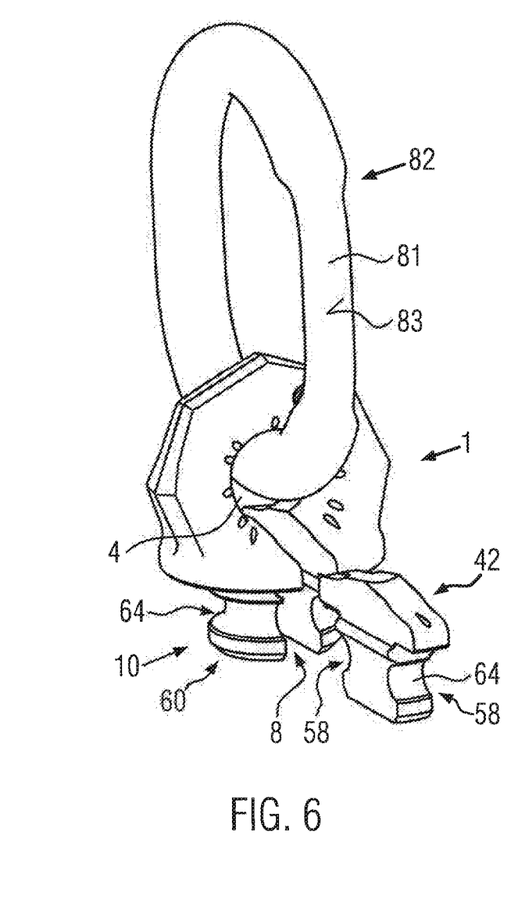
FIG. 6 a schematic perspective view of a further embodiment of a ring element according to the invention with a closing element and a connection element as well as a connecting link.
Figure 7:
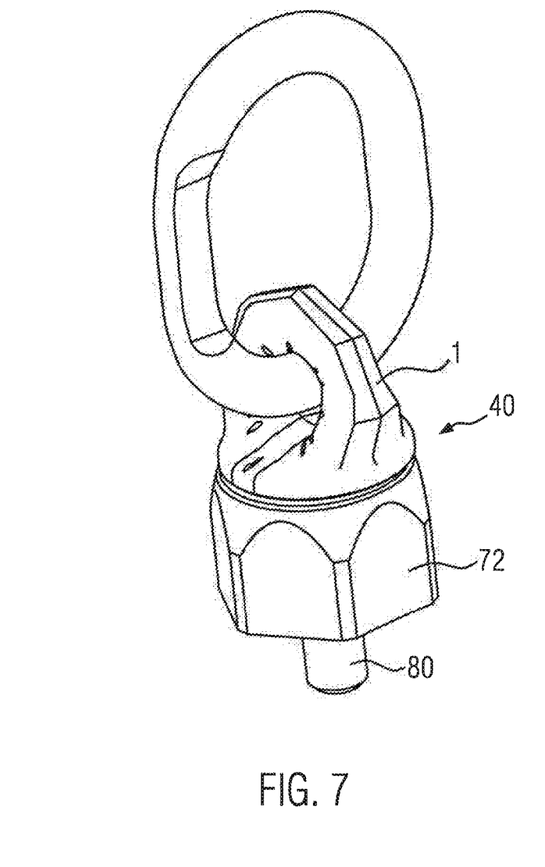
FIG. 7 a further schematic perspective view of the arrangement of FIG. 6 with an installed fastening sleeve.

A further possibility of how a ring element 1 and a closing element 42 could be designed is shown in FIGS. 6 and 7. For the sake of simplicity, only the differences to the previously explained embodiment will be addressed in the following.

In the embodiment of FIGS. 6 and 7, the pin 60 is part of the base 10 of the ring element 1 and divided like the base 10. Just as in the previous embodiment, the closing element 42 can be inserted in the attachment channel 8 in a way that is form-fitting and straight in the direction transversal to the plane 18 (FIG. 2). The front surfaces 58 of the closing element 42 continue the circumferential surface 14 of the base 10, which is interrupted by the attachment channel 8, and in particular also the circumferential surface of the pin 60 in a way that is as shock- and interruption-free as possible.

If the closing element 42 is inserted in the attachment channel 8, the completed ring element 1 can be fastened in the fastening sleeve 72 in the same way as in the previous embodiment.

FIGS. 6 and 7 also show that the attachment channel 8 can be used to transfer a connection element 82, here a ring link, that is equipped with a flattened section 81 into the ring opening 4. Due to the geometry of the attachment channel 8, it can be ensured that only one ring link 82, which corresponds to this geometry, can be transferred into the ring section 2. The attachment channel 8 and the flattened section 81, which is designed complementarily to the attachment channel 8, form a protection against incorrect plugging. The incorrect plugging protection prevents that for example a connection link 82 will be paired with a ring element 1 that is inappropriate based on its strength values. The connection link 82 can preferably be inserted in the ring opening 4 through the attachment channel 8 in only one single position, for example only with the external edge 83 of the flattened section first. Outside of the flattened section 81, the connection link cannot be inserted in the attachment channel 8 and/or the ring opening 4.

In the structure of the lashing or attachment device 40 of FIGS. 6 and 7, the ring element 1 is embedded directly in the fastening sleeve 72, which enables a more direct force flow than for the indirect support of the ring element 1 via the closing element 42 in the fastening sleeve 72 in the embodiment of FIGS. 3 to 5. However, the structure of FIGS. 6 and 7 requires exact manufacturing of the closing element so that no protrusions, which hamper unrolling of the roller bodies, will be formed in the groove 64 on the transition between the closing element 42 and the base 10.

If no pivot bearing of the base 10 is desired, a spring pin, a screw or another connection element can reach transversally through the fastening sleeve 72 and the pin 60 instead of the pivot bearing 77 in order to connect the pin 60 and the fastening sleeve 72 rigidly to one another.

With the ring element 1, the closing element 42 and the fastening sleeve 72, a modular system can be set up in which for example a fastening sleeve 72 could be used for different structural forms of ring elements 1 and closing elements 42 or for which different fastening sleeves could be used for a combination of a ring element 1 and a closing element 42.

Figures 8, 9:
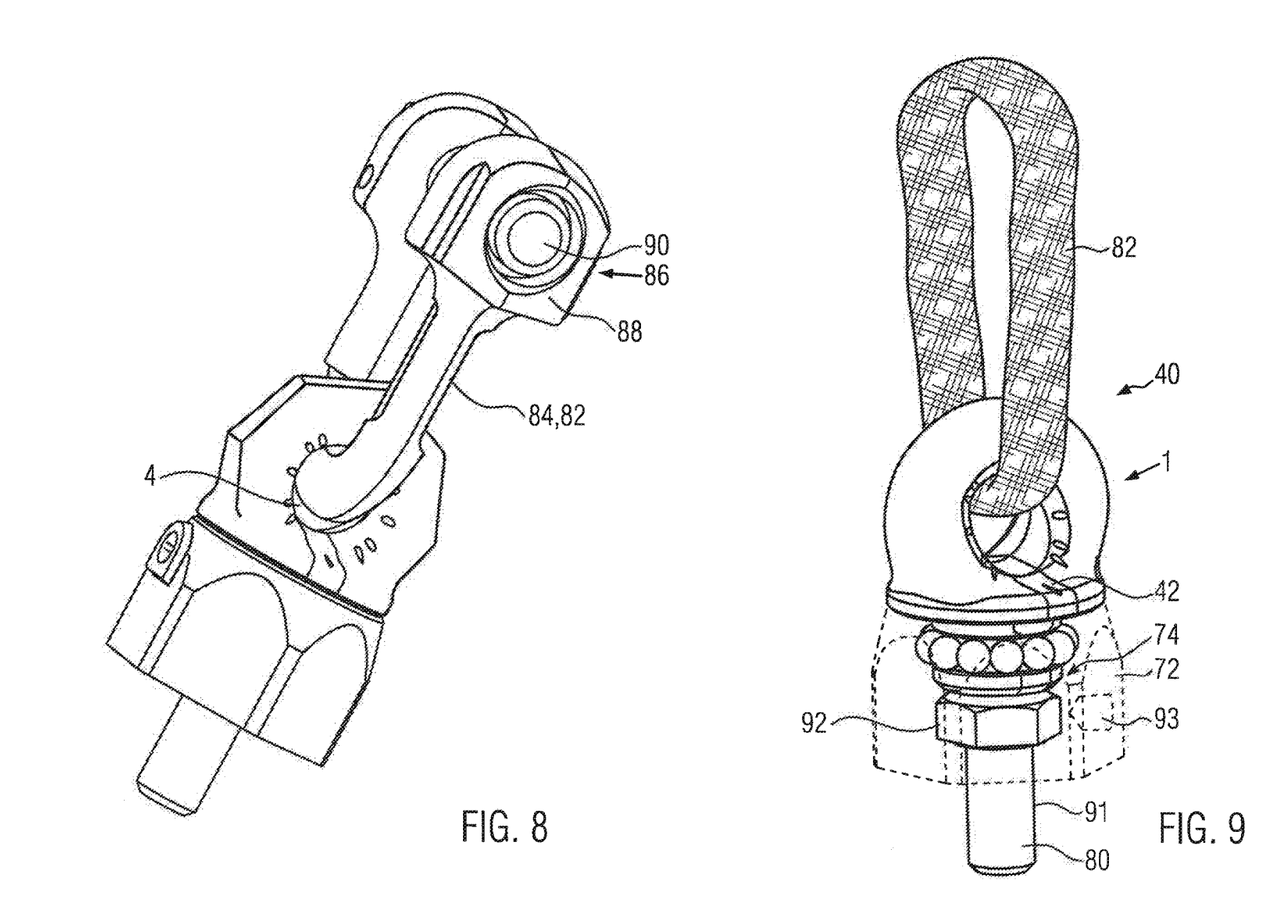
FIG. 8 a schematic perspective view of a further embodiment of a ring element according to the invention with a closing element, a connection element as well as a shackle.
FIG. 9 a schematic perspective view of a further embodiment of a ring element according to the invention with a closing element, a connection element as well as a textile sling.

FIG. 8 shows lashing or attachment devices 40 of FIGS. 6 and 7 with a shackle 84 as a connection link 82 that is held undetachably in the ring opening 4. On its leg ends 86, the shackle 84 has two heads 88 that do not fit through the ring opening 4. Due to the flattened section 81, however, the shackle 84 can be transferred through the attachment channel 8 into the ring opening if the closing element 42 is removed. This way, the shackle bolt 90, which extends and is screw-fixed between the two heads 88, is prevented from getting into the ring opening 4 where it could detach itself in case of swivel movements.

FIG. 9 shows a further variant of the lashing or attachment device 40. In contrast to the previous embodiments, the fastening sleeve does not have an integrated fastening section 80. Rather, the fastening section 80 is part of a separate fastening element 91, in this case a screw. The fastening section 80 of the fastening element 91 protrudes through the lower end of the fastening sleeve 72. The screw head 92 be inserted in a form-fit way in a complementarily formed receptacle 74 of the fastening sleeve 72 so that a rotary movement of the fastening sleeve 72 rotates the fastening element 91 along.

The connection link 82 in FIG. 9 is a loop and/or sling made of textile material, for example of Dyneema. Like the connection links of the previous embodiments, it is inserted through the attachment channel 10 after the closing element 42 has been removed from the ring element 1.

FIG. 9 shows a receptacle 93 of the fastening sleeve 72, in which a transponder can be integrated to read component-specific data in and out. For example, such a RFID chip can be staved in the receptacle 93. Alternatively and in addition, also the ring element and/or the closing element 42 can be equipped with transponders.

Figure 10:
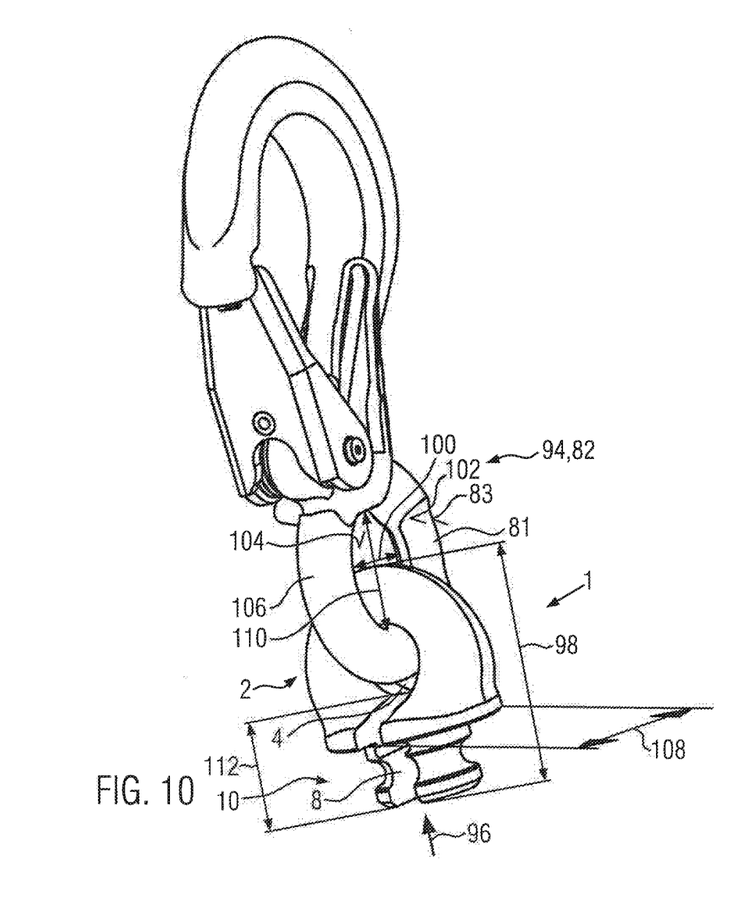
FIG. 10 a schematic perspective view of a further embodiment of a ring element according to the invention without a closing element and a connection element and with a loop hook.

FIG. 10 shows the use of a loop hook 94 as a connection element 82 in an exemplary way. The following illustration of the functioning of the loop hook is independent of its design and can therefore also be used for other forms of connection links 82, for example the ring link of FIGS. 6 and 7 or the shackle of FIG. 8.

To prevent incorrect operations in a very reliable way, the connection link 82, for example the loop hook 94 in FIG. 10, can only be transferred completely into the ring opening 4 through the attachment channel 8 in a single relative position with regard to the ring element 1. Preferably, the connection link 82 is transferred into the attachment channel with the external edge 83 of the flattened section 81 first. To ensure that only a single one of such inserting positions exists, a height 98 of the ring element 1, which is measured in the plane 18, cf. FIG. 1, of the ring opening and in the direction in which the attachment channel 8 opens into the ring opening, i.e. in the inserting direction 96, is greater than a clear span 100 of the connecting link 82 adjacent to the flattened section 81. In such an embodiment, the two straight sections 102 of the flattened section 82 can preferably extend in parallel to the plane 104 that is defined by the connecting link 82.

If the flattened section 81 is integrated completely in the ring opening 4 in such an embodiment, the section 106 that is located opposite to the flattened section 81 is outside of the ring element 1 at the input to the attachment channel 8.

To be able to transfer the connecting link 82 from this inserting position into the operating position shown in FIGS. 6, 7, 8 and 10, it has to be swiveled at first along the ring section 2 around the ring opening 4 so that the section 106 of the connecting link 82 that is outside of the ring element 1 and opposite to the flattened section 81 is moved from its initial position at the attachment channel 8 to a position on top of the ring section 2. In this intermediate position, not the attachment channel 8 is located between the flattened section 81 and the area 106 of the connecting link 82 opposite to it anymore, but the ring section 2. In this intermediate position, a rotation will then be required with a part of the ring section as a rotary axis in order to swivel the flattened section 81 out of the ring opening 4 into the position illustrated in FIG. 10.

The geometry of the ring element 1 is preferably formed such that the swivel and the rotary movement can only take place separately from one another. This can be achieved for example in that the clear span 100 is smaller than a largest width 108 of the ring element in the area of the base 10 and or in the area of the ring element 2 that is adjacent to the base. At the same time, a clear span 110 that is transversal to the clear span 100 of the connecting link is larger than the width 108. This will allow for swiveling of the connecting link 82 along the ring section 2 only if the flattened section 81 is located in the ring opening 4. In addition, a height 112 of the attachment channel 8 in the inserting direction 96 should be smaller than the clear span 100 in this embodiment.

If the largest width 98 has passed the connecting link 82, the flattened section 81 can be turned out of the ring opening 4 so that it will not touch the ring element 1 in case of stress. Consequently, the surfaces of the connecting link 82 and the ring element 1 can fit more closely on one another and therefore reduce the surface pressure.

REFERENCE NUMERALS

1 Ring element
2 Ring section
4 Ring opening
6 Area of the ring opening on the side of the load or the lifting gear
8 Attachment channel
10 Base of the ring element
12 Jaw-shaped halves of the base
14 Circumferential surface of the base
16 Cross-section through circumferential surface
18 Plane of the ring opening
20 Side wall of the attachment channel
22 Form-fit element of the base
24 Groove of the side wall
26 Ground of the groove
28 Ends of the groove
30 Wall of the groove
32 Floor surface of the ring section
34 Edge of the ring opening
36 Marking
38 Recess
40 Attachment device
42 Closing element
44 Lateral surfaces of the closing element
46 End of the closing element that faces the ring element
48 Form-fit element of a lateral surface
49 Linear guiding
50 Locking surface of the form-fit elements on the side of the base and of the closing element
56 Upper side of the closing element
57 Line
58 Front surfaces of the closing element
59 Ends of the closing element
60 Pin
61 End of the closing element on the side of the pin
62 Fastening elements
64 Groove
66 Ground of the groove
68 Roller body
70 Direction of stress
72 Fastening sleeve
74 Receptacle of the fastening sleeve
75 Collar
76 Bearing groove of the fastening sleeve 76 Rotary bearing
77' Slide bearing
78 Filling opening
79 Slide bearing ring
80 Fastening section of the fastening sleeve
81 Flattened section
82 Connecting link
83 Outer edge of the flattened section
84 Shackle
86 Leg ends of the shackle
88 Head
90 Shackle bolt
91 Fastening element
92 Screw head
93 Transponder receptacle
94 Groove hook
96 Inserting direction
98 Height of the ring element
100 Clear span
102 Straight sections of the flattened section
104 Plane formed by the connecting link
106 Section of the connecting link that is opposite to the flattened section
108 Largest width of the ring element
110 Clear span of the connecting link
112 Height of the attachment channel

The invention claimed is:

1. Ring element (1) for a lashing or attachment device (40) with a base (10) and a ring section (2) that is closed opposite to the base (10) and that opens up a ring opening (4), wherein the base (10) has a pin (60) with a fastening element (62) and is divided by an attachment channel (8) that leads into the ring opening (4), characterized in that at least one of a plurality of side walls (20) of the attachment channel (8) that are facing one another is equipped with at least one form-fit element (22) which extends continuously along the at least one of the plurality of side walls (20).

2. The ring element (1) according to claim 1, characterized in that a circumferential surface (14) of the base (10) is circular at least in a sectional way in a cross-section (16) that is perpendicular to a plane (18) defined by the ring opening (4).

3. Lashing or attachment device (40), characterized by a ring element (1) with a base (10) and a ring section (2) that is closed opposite to the base (10) and that opens up a ring opening (4), wherein the base (10) is divided by an attachment channel (8) that leads into the ring opening (4), where at least one of a plurality of side walls (20) of the attachment channel (8) are facing one another is equipped with at least one form-fit element (22) which extends continuously along the at least one of the plurality of side walls (20), and by a closing element (42) that is insertable into the attachment channel (8) and whose side surfaces are designed complementarily to the attachment channel (8) at least in a sectional way, wherein a linear guiding (49), which is formed by at least one side area (44) of the closing element (42) and the at least one of the plurality of side walls (20) of the attachment channel (8), is provided through which the closing element (42) is guided movably in a direction perpendicular to a plane (18) that is opened up by the ring opening (4).

4. The lashing or attachment device (40) according to claim 3, characterized in that the closing element (42) has a pin (60).

5. The lashing or attachment device (40) according to claim 4, characterized in that the pin (60) is equipped with a fastening element (62).

6. The lashing or attachment device (40) according to claim 5, characterized in that the fastening element (62) has a groove (64) that extends around the pin (60).

7. The lashing or attachment device (40) according to claim 3, characterized in that the closing element (42) is equipped with front surfaces (58) that are opposite to one another and that respectively form sections of a cylinder surface area.

8. The lashing or attachment device (40) according to claim 3, characterized in that a fastening sleeve (72) is provided, which has a fastening section (80) to fasten the lashing or attachment device (40) on a load or a carrier and a collar (75) that surrounds a receptacle (74) on a side that faces away from the fastening section (80), and that the receptacle (74) is designed complementarily to the base.

9. The lashing or attachment device (40) according to claim 8, characterized in that the collar (75) covers the attachment channel (8) at least in a sectional way in a direction transversal to the plane (18) that is defined by the ring opening (4).

10. The lashing or attachment device (40) according to claim 3, characterized by a connecting link (82) that is equipped with a flattened section (81), which is insertable through the attachment channel (8) into the ring opening (4), and that is designed so that it can be swiveled around the ring opening (4) along the ring section (2) while being inserted in the ring opening (4).

11. The lashing or attachment device (40) according to claim 10, characterized in that a clear span (100) of the connecting link (82), which is adjacent to the flattened section (81), is smaller than an overall height (98) of the ring element (1).

12. The lashing or attachment device (40) according to claim 10, characterized in that the connecting link (82) is formed such that it can only be inserted in the ring opening (4) in a single relative position of the connecting link (82) and the ring element (1).

13. The lashing or attachment device (40) according to claim 10, characterized in that the connecting link (82) is formed such that it can be swiveled around the ring opening (4) along the ring section (2) in only a single relative position to the ring element (1).

14. The lashing or attachment device (40) according to claim 10, characterized in that the connecting link (82) in the ring opening (4) is held rotatably from an inserting position, in which the flattened section (81) is located in the ring opening (4), to an operating position in which the flattened section (81) is moved out of the ring opening (4).

15. Lashing or attachment device (40), characterized by a ring element (1) with a base (10) and a ring section (2) that is closed opposite to the base (10) and that opens up a ring opening (4), wherein the base (10) is divided by an attachment channel (8) that leads into the ring opening (4), where at least one of a plurality of side walls (20) of the attachment channel (8) that are facing one another is equipped with at least one form-fit element (22) which extends continuously along the at least one of the plurality of side walls (20), and by a closing element (42) that is insertable into the attachment channel (8) and whose side surfaces are designed complementarily to the attachment channel (8) at least in a sectional way, wherein the closing element (42) when inserted in the attachment channel (8) fits flush with at least one circumferential surface (14) of the base (10).

16. The lashing or attachment device (40) according to claim 15, characterized in that front surfaces (58) of the closing element (42) complement the at least one circumferential surface (14) of the base (10) to a complete cylinder surface area.

17. Lashing or attachment device (40), characterized by a ring element (1) with a base (10) and a ring section (2) that is closed opposite to the base (10) and that opens up a ring opening (4), wherein the base (10) is divided by an attachment channel (8) that leads into the ring opening (4), where at least one of a plurality side walls (20) of the attachment channel (8) that are facing one another is equipped with at least one form-fit element (22) which extends continuously along the at least one of the plurality side walls (20), and by a closing element (42) that is formed such that it is insertable into the attachment channel (8) and whose side surfaces are designed complementarily to the attachment channel (8) at least in a sectional way, wherein the closing element (42) is formed such that it has two front surfaces (58) that fit flush with a circumferential surface (14) of the base (10) in an inserted state.

\* \* \* \* \*